3,823,228
TGE VIRUS VACCINE

Deam H. Ferris, Greenport, N.Y., and Angel S. Arambulo, Chicago, Ill., assignors to University of Illinois Foundation, Urbana, Ill.
No Drawing. Continuation-in-part of abandoned application Ser. No. 184,910, Sept. 29, 1971. This application Aug. 30, 1972, Ser. No. 285,036
Int. Cl. A61j 3/07; C12k 1/08
U.S. Cl. 424—35  10 Claims

ABSTRACT OF THE DISCLOSURE

Oral dosage form of villiarly effective biologicals for administration to animals comprises enteric-coated particles having controlled maximum size. Vaccine for protection of swine against TGE comprises enterically coated particles, less than about 2.0 mm. in diameter, containing attenuated TGE virus vaccine.

---

This application is a continuation-in-part of our co-pending application Ser. No. 184,910, filed Sept. 29, 1971, now abandoned.

This invention relates generally to the oral administration of biologicals to animals. More particularly, it relates to a novel dosage form of oral vaccine for protection of swine against TGE and to the method of protecting swine by administering the vaccine.

Transmissible gastroenteritis, commonly called TGE, is a highly contagious viral disease which attacks swine of all ages. While the disease is severe in all swine it is particularly acute in baby pigs, in which it causes severe vomiting, diarrhea, and weight loss with consequent high mortality rates. The disease has been known for many years but the incidence and severity of the attacks appears to be increasing. At the present time the number of pigs which are affected annually by TGE is numbered in the millions and the economic loss resulting to the farmer from the ravages of the disease is severe.

The mechanism of transmission of TGE has not yet been fully determined, although birds, rodents, and wild carnivores are suspected to be carriers. Isolation of infected pigs from all other animal life has proved to be ineffective in controlling transmission of the disease, possibly indicating that transmission occurs through human contact or through aerial means.

All attempts to prevent or control the transmission of TGE to date have been failures or insufficiently effective for practical use. Among the methods which have been tried for controlling the disease, in the absence of any other effective method, has been the feeding by farmers of virulent TGE virus to pregnant sows in the hope that sufficient antibodies would be produced in their milk for conferring some immunity to the nursing piglets. Although this method does in fact partially control the disease, it is unsatisfactory for the following reasons. The infected sow is more likely to abort her litter or to produce an inadequate quantity of milk in which the antibody titers may be low. In addition, the infection may be accidentally transferred to other previously non-infected herds or persistent, or enzooic, TGE could be established within the herd, resulting in continuous disruption in a farrowing program. Clearly, the practice of infecting pregnant sows with virulent TGE virus is not only inadequate as a method for controlling the transmission of the disease among baby pigs, but is also dangerous and ill-advised.

Other attempts to control the transmission of TGE have involved the use of modified live virus, allegedly non-virulent in nature, or attenuated TGE virus for inoculating pregnant sows, again with the expectation that antibodies would be transferred to the offspring through the sows' milk. Such methods have similarly been found to be ineffective in controlling the disease. Since baby pigs are immunologically immature, they cannot produce protective antibodies in response to a vaccine administered directly. Accordingly, since TGE can be fatal to newborn pigs within a period of less than 24 hours after exposure, the piglets are susceptible to TGE in the event that the pregnant sow has not produced sufficient antibodies or sufficient milk for protection of the litter of baby pigs. In addition, any method which relies solely on vaccination of the pregnant sow for conferring immunity to the litter of piglets requires that such vaccinations be performed continuously even when there is no evidence of an outbreak of TGE. Protection of baby pigs from an unvaccinated sow has been impossible until the present invention.

In its broadest aspect, the present invention provides a method of administering to an animal any villiarly active biological, i.e., any biological which can be absorbed by the villi of the small intestine to produce a desired effect, by orally administering to the animal said biological in the form of enterically coated particles having a controlled maximum size. The method of the invention is particularly applicable to biologicals which are sensitive to the gastric secretions of the animal or susceptible to degradation by body heat. The biologicals used in the invention are prepared in a dosage form comprising solid particles consisting of the biological alone or of a physiologically acceptable solid carrier on or in which the biological is deposited, the particles having a critical maximum size and an enteric coating to protect against degradation by contact with the gastric secretions of the animal. We have found that by limiting the size of the particles, passage thereof through the pyloric valve of the animal into the small intestine occurs within such a short time that conventional enteric coatings are adequate to prevent degradation by the gastric juices or destruction of effectiveness which might result from the animal's body heat in the event the particles remain in the animal's stomach for an excessive period of time.

The term "biological," as used herein, refers to substances which are administered to animals for the effect which they have on the processes producing immunity in the animal, such as vaccines, viruses, toxins, antigens, antibodies, and the like.

The invention stems in part from our discovery that the time of retention of particles in the stomach of an animal, before the particles pass through the pyloric valve into the animal's intestine, is dependent on the size of the particles. In any given species of animal, there is a critical maximum particle size above which the retention time in the stomach rapidly increases and below which the retention time is minimal. For example, in the pig we have determined that whereas pellets which are approximately spherical in shape and have a diameter less than about 2.0 millimeters, and preferably less than about 1.5 millimeters, will pass from the stomach through the pyloric valve into the intestine within reasonably short periods, on the order of 1.5 hours or less, larger pellets remain in the stomach for periods of time which increase sharply with increasing size; for example, pellets having a diameter of 3 mm. may remain in the stomach of a pig for as long as two days. We have further determined that the enteric coatings conventionally used to coat tablets provide *in vivo* periods of protection which are much less than those expected from tests of the same tablets *in vitro* in simulated gastric juices. Accordingly, in order to assure the potency of enteric coated villiarly administered biological materials which are sensitive to heat or gastric secretions, it is essential that the maximum size of the particles used be limited, in accordance with the invention.

Following the method of the invention, we have found that it is possible to immunize both adult sows as well as newborn pigs against the ravages of TGE by adminisration thereto of a dosage form of attenuated TGE virus comprising micropellets, i.e., pellets having a diameter less than 2.0 millimeters and preferably less than 1.5 millimeters, the pellets containing a dried attenuated TGE virus vaccine produced in accordance with conventional procedures. The micropellets are coated with a conventional enteric coating suitable for protecting the micropellets in the stomach of the animal for a period of at least about two hours, within which time most of the pellets will have passed through the animal's pyloric valve into the small intestine, where the enteric coating rapidly dissolves and the vaccine becomes available for absorption by the villi in the small intestine. When administered to adult swine in this manner, the vaccine causes the production of antibodies within the animal's system which effectively protect the animal against infection by TGE. In the case of newborn pigs, which are immunologically immature, the mechanism of protection appears to depend on interference by the vaccine with absorption and replication of TGE virus in the animals' villi, rather than on a true immunological reaction. In any event, and regardless of whether this hypothesis is correct, the fact remains that newborn pigs can be effectively protected against TGE by orally administering to them enterically coated microparticles of attenuated TGE virus vaccine in accordance with the invention.

The specific method used to administer the enterically coated microparticles of TGE to swine is not critical. It is important only that the individual particles be free to pass separately through the pyloric valve. Accordingly, the enteric coated microparticles can be mixed with the animal's food in a concentration sufficient to insure that the animal will have ingested a sufficient quantity of the vaccine to insure protection. Thus, for baby pigs, the microparticles may be mixed with wet baby food or viscous liquid feeds commonly used for piglets. For somewhat older pigs, the microparticles can be mixed in the starting mash and with still older pigs, the particles can be incorporated in the dry foods fed to the animals. Since, however, mixing the particles with the animal's food involves some uncertainty as to the amount of food actually ingested, it is preferred that a known quantity of the microparticles be fed directly into the stomach of the animals, as by the use of a balling gun. In such method, there can be employed quick dissolving gelatin capsules or the like containing a known amount of enterically coated microparticles. The capsules quickly dissolve within the animal's stomach, releasing the individual enteric coated microparticles for passage through the animal's pyloric valve into the small intestine. Since it is possible that the contents of the stomach might interfere with the passage through the pyloric valve, it is preferred that the animal's stomach be empty when the vaccine is given, although this is not essential since we have found that the microparticles rapidly pass through the pyloric valve even when the stomach is full of food.

Regardless of the specific methods used to administer the microcapsules of the invention to swine, it is preferred that the dosage be in accordance with the sample schedule below, in order to afford adequate protection against TGE. Since viral strain may vary in liter, the exact dosage will vary with the particular biological in use. In general, however, the dosage increases with the age of the pig as follows.

| Baby Pigs; Age, Weeks | Dosage, $10^3$ Tissue Culture $ID_{50}$ |
|---|---|
| <2 | 1–100 |
| 2–6 | 2–1000 |
| Pregnant sows | 100–100,000 |

For maximum protection, it is preferred that the above dosage be repeated after an interval of about two weeks.

The critical nature of the size of the particles on their retention time in a pig's stomach is demonstrated by the data of Table I. These data were developed from tests in which macrocapsules of various volumes (0.5–20 ml.) containing steel pellets, 3 mm. in diameter, were administered intact to animals of various sizes. Radiographs of the animals were taken at 15 minutes intervals, of both the right lateral and either the dorsal or ventral view, usually the latter to determine whether the capsule had dissolved, and if so, whether the pellets were still in the stomach. In each case it was found that the enteric coated capsule dissolved within the stomach in less than 2.5 hours and that the steel pellets released when the capsules dissolved were retained in the stomach for five hours to two days. The enteric coatings used in this work were shellac and cellulose acetate phthalate (CAP), a commercial product sold especially for use as an enteric coating, which is made by reacting a partial acetate ester of cellulose with phthalic anhydride. The results set out in Table I demonstrate that the enteric coatings were ineffective in protecting a capsule against dissolution in a pig's stomach for more than about 2½ hours at most and in many cases a substantially less time. It was also found that pellets of 3 mm. diameter were retained in the stomach for a minimum of 5 hours and a maximum of 48 hours, regardless of whether the stomach was in an empty or full condition when the capsules were administered.

TABLE I.—PASSAGE OF ENTERIC COATED MACROCAPSULES THROUGH PIG STOMACH

| Basic preparation | Coating | Filling | Weight of swine, lbs. | Stomach condition | Dissolution Time, hrs. | Dissolution Place | Retention time in stomach, hrs. |
|---|---|---|---|---|---|---|---|
| 20 ml. capsule | 10 cts. shellac | Pellets, 3 mm. diam | 60 | Empty | 2½ | Stomach | 12 |
| Do | do | do | 45 | Full | 2 | do | 10 |
| 2 ml. capsule | do | do | 45 | do | 2 | do | 12 |
| Do | do | do | 30 | Empty | 1¾ | do | 10 |
| 0.5 ml. capsule | do | do | 45 | do | 1.5 | do | 12 |
| Do | do | do | 45 | Full | 1.8 | do | 10 |
| Do | 6 cts. CAP* | do | 35 | do | 1.25 | do | 8 |
| Do | do | do | 25 | Empty | 1.25 | do | 9 |
| Do | do | do | 25 | do | 1.25 | do | 8 |
| Do | do | do | 45 | do | 1.5 | do | 9 |
| Do | 10 cts. CAP | do | 60 | do | 1.5 | do | 5 |
| Do | do | do | 60 | Full | 1.6 | do | 7 |
| Do | do | do | 350 | Fed | 1.5 | do | 48 |
| Do | do | do | 350 | Empty | 1.5 | do | 36 |
| Do | do | do | 400 | Full | 1.5 | do | 36 |
| Do | do | do | 400 | Empty | 1.6 | do | 24 |

*Cellulose acetate phthalate.

Similar results were obtained with other animals, including dogs and puppies, cats, opossum, skunk, rabbit, rat, guinea pig, gerbil, fox and racoon. Although the maximum permissible particle size varied somewhat from species to species, it was found that in every case there existed a critical maximum size of particle, above which the time of passage through the pyloric valve rapidly increased.

Similar enteric coated macrocapsules were also fed to guinea pigs and opossums. It was found that the enteric coating prevented dissolution of the capsule for 3½ to 4½ hours in the stomach of the opossum, but opened within an hour in the stomach of the guinea pig, indicating that CAP as an enteric coating is more successful in the gastric juices of the opossum than in those of swine or guinea pigs. The irregularity of the dissolution time of such enteric coated macrocapsules, however, gives rise to the possibility of heat degradation of the capsule contents, even though the enteric coatings remain intact. The use of enteric coated capsules of relatively large size is therefore not a reliable method of delivering a heat-sensitive biological product to the duodenum of an animal.

The difficulties evidenced by the data of Table I are obviated by the method of the invention employing enteric coated microcapsules which readily pass out of the stomach of the animal into the small intestine before degradation due to gastric juices or heat degradation can occur. We have found that the shape of the microcapsule has some effect on the speed of passage through the pyloric valve, with spherical shapes passing with the least difficulty. Accordingly, microparticles of approximately sperical configuration are preferred for use in the invention.

The speed with which enteric coated microcapsules pass through the stomach of a pig into its small intestine is demonstrated by the data of Table II. In each case the animal was fed a quick dissolving gelatin capsule containing microparticles of barium sulfate which had been enterically coated with CAP. In the times noted in the table (30 to 90 minutes), most of the pellets had passed from the stomach into the small intestine and had dissolved. The relatively few pellets remaining in the stomach of the animals were still intact.

TABLE II.—PASSAGE OF MICRO-ENCAPSULATED PELLETS THROUGH PIG STOMACH INTO SMALL INTESTINE

| Basic preparation | Coating | Filling | Weight of pig, lbs. | Time before dissolution, min. | Place of dissolution |
|---|---|---|---|---|---|
| Micro-encapsulated pellets, 1.5 mm. maximum diameter. | CAP* | Barium sulfate. | 15 | 30 | Small intestine. |
| Do | CAP | do | 30 | 45 | Do. |
| Do | CAP | do | 30 | 30 | Do. |
| Do | CAP | do | 60 | 90 | Do. |
| Do | CAP | do | 60 | 30 | Do. |
| Do | CAP | do | 300 | 50 | Do. |

*Cellulose acetate phthalate.

The use of the method of the invention in protecting baby pigs by vaccinating the pregnant sow is illustrated by the data of Table III. In this work, pregnant sows were vaccinated one month preparturition with an attenuated TGE virus in the form of enterically coated micropellets (less than 1.5 mm. in diameter) contained in a rapidly dissolving capsule. The micropellets comprised sugar pellets of appropriate size, onto which was absorbed a TGE virus which had been attenuated by standard techniques of serial passage through a tissue culture medium followed by freeze-drying in a vacuum. In Test 3, the sow was also given intramammary injections with attenuated virus, while in Test 4, a pathogenic form of TGE virus (Z–1) was used. As controls, there were used an unvaccinated sow and a group of one-day-old pigs. In each test, the piglets born to the vaccinated sow were challenged with Z–1 virus. The results indicate that the vaccination of the pregnant sows gave good protection, although a few of the baby pigs showed mild signs of disease. When the oral vaccination was coupled with intramammary injection, the baby pigs were afforded complete protection against a severe challenge.

TABLE III.—VACCINATION OF PREGNANT SOWS WITH TGE VIRUS IN ENTERIC COATED MICROPELLETS

| Test number | Subject | Vaccine type [1] | Number baby pigs challenged [3] | Number pigs sick | Number pigs died | Percent survival |
|---|---|---|---|---|---|---|
| 1 | Pregnant sow. | M–108, attenuated. | 10 | 3 | 0 | 100 |
| 2 | do | do | 8 | 2 | 0 | 100 |
| 3 | do | do.[2] | 7 | 0 | 0 | 100 |
| 4 | do | Z–1, pathogenic. | 8 | 0 | 0 | 100 |
| 5 [4] | do | None | 7 | 7 | 7 | 0 |
| 6 [4] | Baby pigs, one day old. | Dam unvaccinated. | [5] 3 | 3 | 3 | 0 |

[1] Quantity of vaccine was about $10^7$ TC $ID_{50}$, administered in rapid dissolving capsule.
[2] Each mammary gland also injected with $5\times10^6$ TC $ID_{50}$ of M–108 attenuated virus.
[3] Challenge dose was $10^3$ pig $LD_{50}$ of Z–1 virus.
[4] Control.
[5] Challenge dose was contained in enteric coated micropellets.

Vaccination of a pregnant sow, as practiced in the work reported in Table III, however, requires that the pregnant sow be vaccinated at a time sufficiently before parturition to permit the production of antibodies. Since it cannot be predicted whether an active attack of TGE will be present in the herd at the time of parturition, every pregnant sow must be vaccinated routinely in order to afford protection to the baby pigs.

TABLE IV.—COMPARISON OF INTERFERENCE BY ATTENUATED P–108 TGE VIRUS IN LIQUID FORM AND ENTERIC COATED P–108 VIRUS TO CHALLENGE WITH PATHOGENIC TGE VIRUS IN BABY PIGS

| | | | Protective inoculum | | Challenge [3] | | | |
|---|---|---|---|---|---|---|---|---|
| Test number | Age of pigs, days | Number used | Form | Quantity, $10^3$ TC $ID_{50}$ | Time, hrs. after inoculum | Quantity, pig infective doses (PID) | Signs observed, hrs. after challenge | Results |

TABLE IV.—COMPARISON OF INTERFERENCE BY ATTENUATED P–108 TGE VIRUS IN LIQUID FORM AND ENTERIC COATED P–108 VIRUS TO CHALLENGE WITH PATHOGENIC TGE VIRUS IN BABY PIGS

| | | | Protective inoculum | | Challenge [3] | | | |
|---|---|---|---|---|---|---|---|---|
| Test number | Age of pigs, days | Number used | Form | Quantity, $10^3$ TC $ID_{50}$ | Time, hrs. after inoculum | Quantity, pig infective doses (PID) | Signs observed, hrs. after challenge | Results |
| 1 | 2 | 2 | Liquid [1] | 1 | 24 | 100 | 28 | Diarrhea, vomiting; death. |
| 2 | 2 | 2 | do | 5 | 24 | 100 | 30 | Do. |
| 3 | 2 | 2 | Enteric coated [2] | 1 | 24 | 100 | 48 | Soft feces; survived. |
| 4 | 2 | 2 | do | 2 | 24 | 100 | None | Survived. |
| 5 | 2 | 2 | Liquid | 5 | 48 | 100 | 30 | Severe diarrhea; ½ survived. |
| 6 | 2 | 2 | Enteric coated | 2 | 48 | 100 | None | Survived. |
| 7 | 2 | 2 | Placebo | | 48 | 100 | 24 | Vomiting, diarrhea; death. |
| 8 | 3 | 2 | Liquid [1] | 5 | 48 | 10,000 | 48 | Do. |
| 9 | 3 | 2 | do | 30 | 48 | 10,000 | 48, 72 | Diarrhea; death. |
| 10 | 3 | 2 | Enteric coated [2] | 2 | 48 | 10,000 | 48 | 1 pig, slight diarrhea; second pig, none; both survived. |
| 11 | 3 | 2 | do | 4 | 48 | 10,000 | None | Survived. |
| 12 | 3 | 2 | Placebo | | 48 | 10,000 | 18 | Vomiting, diarrhea; death. |

[1] Fluid from P.K. cell culture titering about $10^3$ TC $ID_{50}$ per ml.
[2] Pelleted microparticles in a capsule (non-coated) titering about $10^3$ TC $ID_{50}$ per capsule.
[3] Challenge was with Z–1 lyophilized and reconstituted virus.

The method of the invention lessens the need for routine vaccination in this manner, permitting baby pigs to be protected at birth in the event that TGE is present in the herd at the time. Although the most complete protection is afforded by vaccination of both the sow (including intramammary injection) as well as the baby pigs, treatment of the baby pigs alone is also effective, as shown in Table IV, which shows the results obtained by inoculating baby pigs born to unvaccinated sows. Table IV also compares the results obtained by feeding a liquid inoculum, i.e., not enteric coated, of an attenuated TGE virus with those obtained with enteric coated microparticles, in accordance with the invention. As can be seen from the data of the table, the uncoated attenuated virus was ineffective against both moderate (Tests 1, 2, 5) as well as severe (Tests 8, 9) challenges. By contrast, the enteric coated inoculum (Tests 3, 4, 6 10 and 11) in each case protected the baby pigs, in most cases without even any signs of sickness.

The attenuated oral vaccine contemplated for use in the present invention can be produced by replication of the TGE virus by standard techniques. If it is to be produced from an animal source, the animal must first be infected with live, active TGE virus. Dogs, pigs, or other subjects known to be susceptible may be used. The infected tissues, principally the small intestine, are subjected to trituration, homogenization, extraction with an appropriate buffered solution, and centrifugation in order to recover the virus. The extracted virus next is purified by means of sucrose density gradient centrifugation. The dose of virus is then standardized to an infective dose of 50% ($ID_{50}$).

The purified, standardized virus is then lyophilized (freeze-dried). The material is transferred to shallow pans and deep frozen, and moisture is eliminated at conditions below the eutectic point of water. The lyophilized material must then be stored in a cool dry, place, after which the bulk lyophilized material is reduced to a fine powder by crushing in a hammer or knife mill. To keep the temperature down, solid carbon dioxide may be milled together with it.

Pelletizing is the next step. The powered attenuated virus is coated onto processed nonpareil (sugar) seeds (or other physiologically acceptable solid carriers) of the appropriate diameters, using acceptable binders and film barrier formers such as arsenic-free shellac or cellulose acetate phthallate (CAP) or others in appropriate solvents and drying agents. At all times, care should be taken not to expose the virus to high temperatures.

Although TGE, which primarily affects swine, has been emphasized in this disclosure, the present invention is not intended to be limited to any particular biological, disease, or animal. As modifications will be obvious to those skilled in the art, the foregoing descriptions have been given for clearness of understanding only, and no unnecessary limitations should be understood therefrom.

We claim:

1. The method of vaccinating a pig against TGE, which pig if adult or immunologically mature is capable on vaccination of producing antibodies which effectively protect the animal against infection by TGE and if newborn or otherwise immunologically immature is capable of absorbing and replicating viruses in the villi to interfere with TGE virus, which method comprises perorally introducing into the stomach of said pig attenuated TGE virus vaccine in the form of approximately spherical microparticles having a maximum diameter less than about 2.0 mm., said vaccine being subject to degradation by contact with the gastric secretions of said pig, said particles having an enteric coating which is relatively insoluble in the stomach of said pig but which dissolves rapidly in the intestine, whereby said particles pass from the stomach through the pyloric valve into the intestine before said enteric coating is destroyed by contact with gastric secretions, the dosage of said vaccine being about $10^3$ to $10^6$ T.C. $ID_{50}$ for immature pigs and about $10^5$ to $10^8$ T.C. $ID_{50}$ for mature pigs.

2. The method of claim 1 wherein said microparticles are contained in a dosage form comprising a container which dissolves readily in the stomach of said pig, releasing said enterically coated microparticles for passage through the pyloric valve of said pig.

3. The method of claim 1 wherein said particles have a maximum diameter less than about 1.5 mm.

4. The method of claim 3 wherein said vaccine is administered at a dosage rate in accordance with the following schedule:

| Baby Pigs; Age, Weeks | Dosage, $10^3$ Tissue Culture $ID_{50}$ |
|---|---|
| <2 | 1–100 |
| 2–6 | 2–1000 |
| Pregnant Sows | 100–100,000 |

5. The method of claim 1 wherein said pig is a pregnant sow, and said vaccination occurs a sufficient period of time before parturition to cause the production of antibodies effective against TGE, which antibodies are transmitted via the sow's milk to the suckling piglets after parturition.

6. A biological product for oral administration to a pig for protection against TGE comprising TGE virus vaccine in the form of approximately spherical microparticles, said vaccine being subject to degradation by contact with the gastric secretions of said pig, with an enteric coating covering each particle of said vaccine, said microparticles having a maximum diameter less than about 2.0 mm., whereby they will pass from the stomach through the pyloric valve into the intestine of said pig before said enteric coating dissolves in said gastric secretions.

7. The biological product of claim 6 wherein said microparticles have a maximum diameter less than about 1.5 mm.

8. A biological product in dosage form for oral administration to swine for protection against TGE comprising TGE attenuated virus vaccine in solid microparticulate form, each particle of said vaccine having an enteric coating, said particles being approximately spherical and having a maximum diameter less than about 1.5 mm., and encapsulation means for holding said microparticles in dosage form, said dosage form containing about $10^3$ to $10^8$ T.C. $ID_{50}$ of said vaccine, said encapsulation means being readily soluble in contact with the gastric secretions of the animal to which it is administered, said enteric coating being effective to prevent degradation of said vaccine by said gastric secretions for the time said particles remain in the stomach of said animal, but being readily soluble in the intestinal secretions thereof after said microparticles have passed through the pyloric valve.

9. The vaccine of claim 7 in which said enteric coating comprises cellulose acetate phthalate.

10. The vaccine of claim 9 in which said vaccine is deposited on or in a physiologically acceptable solid particulate carrier.

References Cited

UNITED STATES PATENTS

| | | | |
|---|---|---|---|
| 3,081,233 | 3/1963 | Enz et al. | 424—33 |
| 2,957,804 | 10/1960 | Shuyler | 424—17 |
| 3,519,710 | 7/1970 | Bass | 424—89 |
| 3,458,621 | 7/1969 | Tint | 424—35 |
| 3,072,528 | 1/1963 | Kludas et al. | 424—93 |
| 3,376,199 | 4/1968 | Coles et al. | 424—89 |
| 3,317,393 | 5/1967 | Chanock et al. | 424—89 X |
| 2,369,218 | 2/1945 | Dick et al. | 424—93 X |
| 3,541,203 | 11/1970 | Fogle et al. | 424—93 X |
| 2,946,724 | 7/1960 | Valentine | 424—89 |
| 3,127,318 | 3/1964 | Eversole et al. | 424—89 |
| 3,585,108 | 6/1971 | Welter | 424—89 |

SHEP K. ROSE, Primary Examiner

U.S. Cl. X.R.

424—4, 34, 88, 89, 93

PO-1050
(5/69)

UNITED STATES PATENT OFFICE
CERTIFICATE OF CORRECTION

Patent No. 3,823,228              Dated  July 9, 1974

Inventor(s) Deam H. Ferris and Angel S. Arambulo

It is certified that error appears in the above-identified patent and that said Letters Patent are hereby corrected as shown below:

Column 4, line 8, "strain" should be --strains--;
Column 5, line 23, "sperical" should be --spherical--;
Columns 5 and 6, line 48, Table IV heading is duplicated;
Column 7, line 17, after "6" insert a comma (,);
Column 7, line 37, after "cool" insert a comma (,);
Column 7, line 42, "powered" should be --powdered--.

Signed and sealed this 8th day of October 1974.

(SEAL)
Attest:

McCOY M. GIBSON JR.                C. MARSHALL DANN
Attesting Officer                  Commissioner of Patents